United States Patent
Starke et al.

(10) Patent No.: US 10,611,483 B2
(45) Date of Patent: Apr. 7, 2020

(54) PASSENGER SEAT ARRANGEMENT FOR A TRANSPORT VEHICLE

(71) Applicant: AIRBUS Operations GmbH, Hamburg (DE)

(72) Inventors: Frank Starke, Hamburg (DE); Michael Harriehausen, Hamburg (DE); Thomas Lerche, Hamburg (DE); Bastian Schaefer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 282 days.

(21) Appl. No.: 15/285,003

(22) Filed: Oct. 4, 2016

(65) Prior Publication Data
US 2017/0101186 A1 Apr. 13, 2017

(30) Foreign Application Priority Data
Oct. 8, 2015 (DE) .................. 10 2015 219 542

(51) Int. Cl.
*B64D 11/06* (2006.01)

(52) U.S. Cl.
CPC ........ *B64D 11/0601* (2014.12); *B64D 11/062* (2014.12); *B64D 11/0605* (2014.12); *B64D 11/0636* (2014.12); *B64D 11/0648* (2014.12); Y02T 50/46 (2013.01)

(58) Field of Classification Search
CPC ..... B64D 11/03; B64D 11/06; B64D 11/0601; B64D 11/0605; B64D 11/0627; B64D 11/0648; B64D 11/0649; B64D 11/0619; B64D 11/062; B64D 11/0636; B64D 11/0647–0649; B64D 11/0696; B60N 2/01; B60N 2/012
See application file for complete search history.

(56) References Cited

U.S. PATENT DOCUMENTS

| 778,219 A | 12/1904 | Budd |
| 2,669,284 A * | 2/1954 | Pall ................. B64D 11/06 244/122 R |
| 2,704,989 A * | 3/1955 | Konecny .............. B60F 3/0092 114/43 |

(Continued)

FOREIGN PATENT DOCUMENTS

| DE | 7625522 | 12/1976 |
| DE | 2601102 | 7/1977 |

(Continued)

OTHER PUBLICATIONS

German Search Report, dated Jun. 20, 2016, priority document.

*Primary Examiner* — Christopher D Hutchens
(74) *Attorney, Agent, or Firm* — Greer, Burns & Crain Ltd.

(57) ABSTRACT

A passenger seat arrangement for a transport vehicle has at least one first passenger seat or row of seats having a first backrest, at least one second passenger seat having a second backrest which, by its rear side, faces the rear side of the first backrest, and a seat supporting frame. The seat supporting frame comprises a first backrest reinforcing strut which is arranged along the first backrest at a first inclination angle with respect to the horizontal, and a second backrest reinforcing strut which is arranged along the second backrest at a second inclination angle, supplementary to the first inclination angle, with respect to the horizontal.

11 Claims, 2 Drawing Sheets

(56) References Cited

U.S. PATENT DOCUMENTS

| | | | | |
|---|---|---|---|---|
| 3,184,766 A | * | 5/1965 | Mortrude | B60N 2/34 296/64 |
| 3,314,720 A | * | 4/1967 | Millington | B64D 11/06 188/268 |
| 3,630,566 A | | 12/1971 | Barecki | |
| 3,653,713 A | * | 4/1972 | Reason | B60N 2/242 297/163 |
| 3,762,764 A | * | 10/1973 | McJunkin | B60N 2/242 296/63 |
| 4,303,271 A | * | 12/1981 | Law | B60N 2/01 296/10 |
| 4,776,635 A | * | 10/1988 | Halliez | B60N 2/242 297/440.15 |
| 7,252,268 B2 | * | 8/2007 | Saint-Jalmes | B64D 11/00 244/118.6 |
| 7,464,963 B2 | * | 12/2008 | Hepner | B60N 2/24 280/756 |
| 7,856,762 B2 | * | 12/2010 | Deisenroth | B60N 2/4242 52/143 |
| 8,439,622 B2 | * | 5/2013 | Strong | B63B 27/16 114/363 |
| 2004/0212243 A1 | * | 10/2004 | Johnson | A47C 5/043 297/452.18 |
| 2008/0224510 A1 | | 9/2008 | Hankinson et al. | |
| 2009/0267390 A1 | * | 10/2009 | Honnorat | B60N 2/4242 297/216.16 |
| 2013/0228652 A1 | * | 9/2013 | Joffre | B64D 25/04 244/122 R |
| 2015/0021437 A1 | * | 1/2015 | Bacquey | B64D 11/0689 244/118.6 |
| 2015/0145295 A1 | * | 5/2015 | Cecinas | B64D 11/0619 297/216.1 |
| 2015/0158590 A1 | * | 6/2015 | Gehret | B64D 11/062 297/474 |
| 2015/0210393 A1 | * | 7/2015 | Savian | B64D 11/0601 244/118.6 |

FOREIGN PATENT DOCUMENTS

| | | | | |
|---|---|---|---|---|
| FR | 2826613 A1 | * | 1/2003 | B60K 5/00 |
| GB | 715114 A | * | 9/1954 | B64D 11/00 |
| WO | 2010131014 | | 11/2010 | |
| WO | 2015083088 | | 6/2015 | |

* cited by examiner

PASSENGER SEAT ARRANGEMENT FOR A TRANSPORT VEHICLE

CROSS-REFERENCES TO RELATED APPLICATIONS

This application claims the benefit of the German patent application No. 102015219542.2 filed on Oct. 8, 2015, the entire disclosures of which are incorporated herein by way of reference.

TECHNICAL FIELD OF THE INVENTION

The present invention relates to a passenger seat arrangement for a transport vehicle and to a passenger aircraft having a passenger seat arrangement of this type.

BACKGROUND OF THE INVENTION

Although the passenger seat arrangement described herein can be used in various types of vehicles, the seat arrangement and the problem it addresses will be described in detail with regard to a passenger aircraft. However, in principle, the present invention can also be used in other aircraft, and also in watercraft, rail vehicles, spacecraft or the like, which are suitable for transporting people.

Passengers in transport vehicles, such as passenger aircraft or rail vehicles are frequently provided with seats during the journey which have to be connected in a stable manner to the vehicle. The construction of seats of this type is described, for example in U.S. Pat. No. 778,219 A. In this respect, seat arrangements for transport vehicles are manufactured such that they are both mechanically stable and of a low weight.

However, many transport vehicles only afford a limited amount of space for the installation and implementation of such seats. In this respect, during the installation of the seats, it is necessary to strike a balance between the greatest possible comfort for the seated passengers and the highest possible capacity for passengers and their luggage or hand luggage in the transport vehicle.

Seats are generally installed in passenger aircraft in a uniform seat orientation so that the passengers sit next to one another or behind one another, looking in the same direction. US 2008/0224510 A1 and WO 2015/083088 A1 propose solutions for an alternative arrangement of individual seats in passenger aircraft which are supposed to utilize the available installation space in the aircraft more efficiently. In this respect, some passengers are sitting such that adjacently seated passengers are looking in opposite directions.

SUMMARY OF THE INVENTION

One of the ideas of the invention is to find solutions for seat arrangements for transport vehicles in which the available installation space in the vehicle can be utilized more efficiently, without thereby unnecessarily adversely affecting the passengers' comfort.

Thus, according to a first aspect of the invention, a passenger seat arrangement for a transport vehicle comprises at least one first passenger seat having a first backrest, at least one second passenger seat having a second backrest which, by its rear side, faces the rear side of the first backrest, and a seat supporting frame. The seat supporting frame comprises a first backrest reinforcing strut which is arranged along the first backrest at a first inclination angle with respect to the horizontal, and a second backrest reinforcing strut which is arranged along the second backrest at a second inclination angle, supplementary to the first inclination angle, with respect to the horizontal.

According to a second aspect of the invention, a passenger aircraft comprises at least one passenger seat arrangement according to the first aspect of the invention.

A fundamental idea of the present invention is to arrange passenger seats for a transport vehicle, such as a passenger aircraft, such that passengers sit, facing each other, in seats which are arranged in tandem in the direction of movement of the transport vehicle. In this arrangement, two passenger seats or rows of seats are arranged in each case such that the backrests thereof are facing each other. The backrests thereby form the guide lines for two longitudinal reinforcing struts which project along the backrests at a supporting angle from a floor supporting strut. As a result, a strut triangle is produced as a supporting frame for the seats, the load take-up points of which have an optimized uniform load distribution.

In particular, the distance between adjacent fastening bolts of the floor supporting strut and the floor can be doubled, in contrast to individually standing seats or rows of seats, as a result of which the loading forces acting on the bolts are halved. As a result, mechanical stresses on the passenger seats, on the bolts and on the seat assembly rail on the floor of the transport vehicle can advantageously be reduced. The improved mechanical stability means that material can be saved and thereby the system weight can be reduced during the implementation of the passenger seat arrangement.

The upper load take-up point, at which the two longitudinal reinforcing struts meet and are interconnected, allows the implementation of an anchor point. For example, three-point safety belts for forward-facing seats, i.e., seats which are directed in the direction of travel, of the passenger seat arrangement can be connected to the fuselage structure at or in the vicinity of such an anchor point.

A further advantage of this passenger seat arrangement is the creation of storage space inside the substantially prismatic free space, defined by the reinforcing struts, under the seats behind the respective backrests. Consequently, it is advantageously possible to dispense with storage compartments above the seats, for example, thereby making it possible to further enhance the passengers' comfort, because there is more headroom and heavy pieces of luggage no longer have to be lifted above the head.

The entire structure of the passenger seat arrangement can be kept simple and the flexibility of the distances between individual rows of seats is maintained.

According to an embodiment of the passenger seat arrangement, the passenger seat arrangement can also have a floor supporting strut which is arranged between the floor-side ends of the first and second backrest reinforcing struts.

According to a further embodiment of the passenger seat arrangement, the passenger seat arrangement can also comprise a first seat surface reinforcing strut which is arranged between the floor supporting strut and the underside of a seat surface of the first passenger seat, and a second seat surface reinforcing strut which is arranged between the floor supporting strut and the underside of a seat surface of the second passenger seat.

According to a further embodiment of the passenger seat arrangement, the passenger seat arrangement can have at least two first adjacently arranged passenger seats and at least two second adjacently arranged passenger seats, the backrests of which are all arranged in a coplanar manner. In this respect, in a variant, a first assembly crossbeam can be provided which is connected to the floor-side end of the first backrest reinforcing strut vertically to the floor supporting strut. In a further variant, a second assembly crossbeam can be provided which is connected to the floor-side end of the second backrest reinforcing strut in parallel with the first assembly crossbeam.

According to a further embodiment of the passenger seat arrangement, the ends, opposite the floor-side ends, of the first and second backrest reinforcing struts can be connected at an anchor point. In this respect, in a variant, at least one three-point belt for one of the passenger seats can be provided, which belt is anchored to the seat supporting frame at the anchor point.

According to a further embodiment of the passenger seat arrangement, the free space between the first and second backrest reinforcing struts and under the seat surfaces of the first and second passenger seats can be designed as luggage storage space.

According to an embodiment of the passenger aircraft, the passenger aircraft can have at least two passenger seat arrangements according to the invention which are arranged in tandem in the direction of flight of the passenger aircraft. In a variant, a table can be installed between the two passenger seat arrangements.

According to a further embodiment of the passenger aircraft, the floor supporting strut of the at least one passenger seat arrangement can be rigidly connected to the floor of a passenger cabin of the passenger aircraft.

The above embodiments and developments can, where appropriate, be combined with one another as desired. Further possible embodiments, developments and implementations of the invention also include combinations, which have not been explicitly mentioned, of features of the invention described above or in the following with reference to the embodiments. In particular, in this case, a person skilled in the art will also add individual aspects as improvements or additions to the respective basic forms of the present invention.

BRIEF DESCRIPTION OF THE DRAWINGS

In the following, the present invention will be described in more detail with reference to the embodiments shown in the schematic figures, in which.

The accompanying figures are intended to provide further understanding of the embodiments of the invention. They show embodiments and, together with the description, serve to explain principles and concepts of the invention. Other embodiments and many of the mentioned advantages will become apparent from the drawings. The elements of the drawings are not necessarily shown to scale in relation to one another.

In the figures of the drawings, identical, functionally identical and identically operating elements, features and components have been provided with the same reference signs in each case, unless indicated otherwise.

DETAILED DESCRIPTION OF THE PREFERRED EMBODIMENTS

Figure 1:
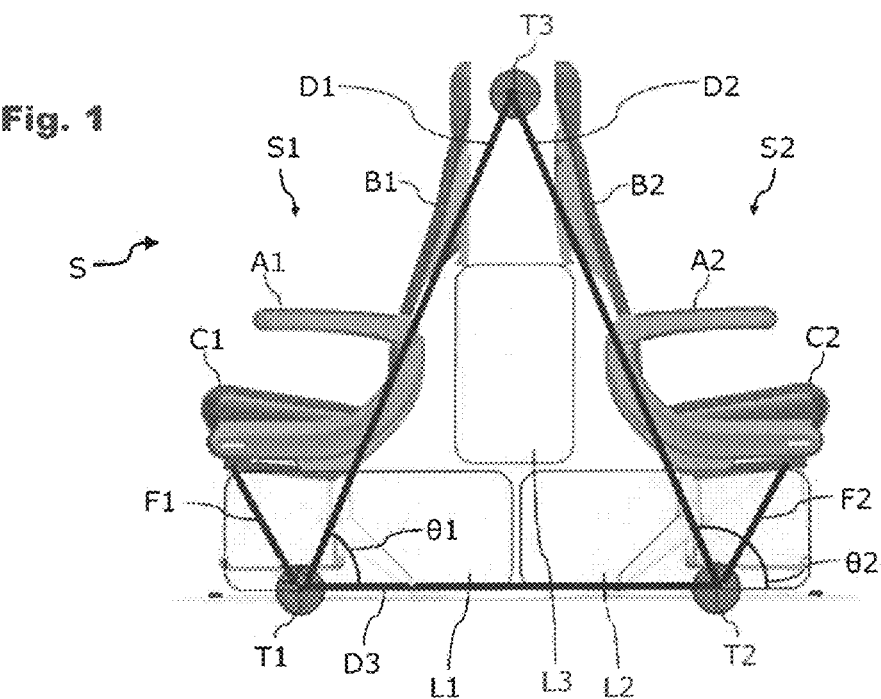
FIG. 1 is a schematic side view of a passenger seat arrangement according to an embodiment of the invention.
Figure 2:
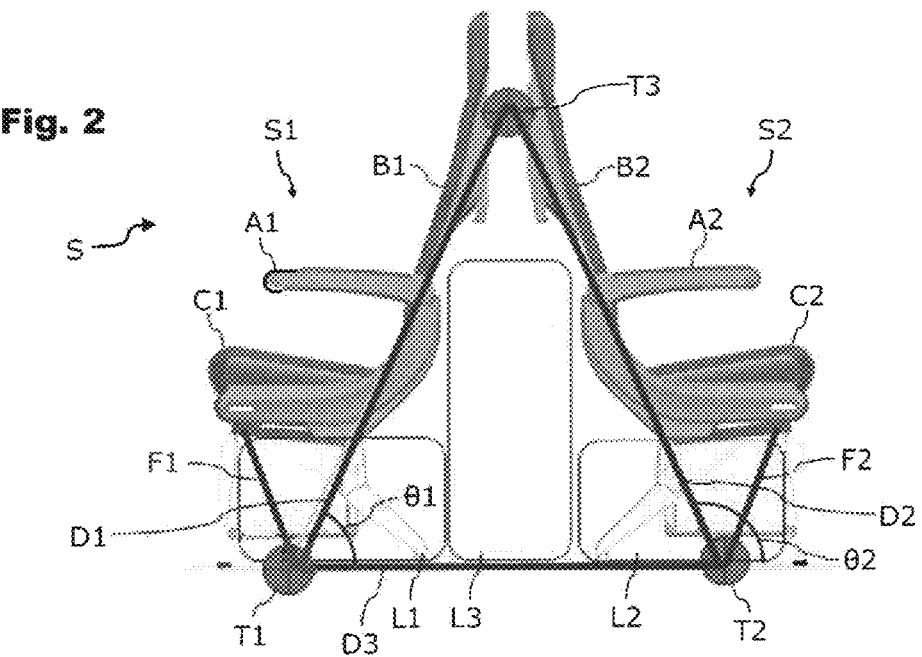
FIG. 2 is a schematic side view of a passenger seat arrangement according to a further embodiment of the invention.

FIGS. 1 and 2 are each schematic side views of a passenger seat arrangement S. The passenger seat arrangements S of FIGS. 1 and 2 substantially only differ from one another on account of the geometric shape of the isosceles triangles and on account of their height and width ratios relative to the height of the passenger seats. In this case, in the drawing, the passenger seat arrangement S has a left-hand side passenger seat and a right-hand side passenger seat. With regard to a possible installation position in a passenger aircraft, for example, the passenger seat, shown on the left-hand side in the drawing can be oriented in the opposite direction to the direction of flight and the passenger seat shown on the right-hand side in the drawing can be oriented in the direction of flight, or vice versa. Without restricting the generality, the passenger seat on the left-hand side in the drawing is denoted as the first passenger seat S1 and the passenger seat on the right-hand side in the drawing is denoted as the second passenger seat S2. In this case, the passenger seats S1 and S2 can each have backrests B1 and B2 and optionally also armrests A1 and A2.

In this case, it is also possible for a plurality of both first and second passenger seats S1 and S2 of this type to be arranged next to one another, adjacently arranged passenger seats S1 and S2 having backrests B1 and B2 which are all arranged in a coplanar manner. A perspective illustration of a floor-side, three-dimensional view of a passenger seat arrangement S of this type having both three left-hand side and three right-hand side adjacently arranged passenger seats S1 and S2 is shown by way of example in FIG. 4.

Figure 3:
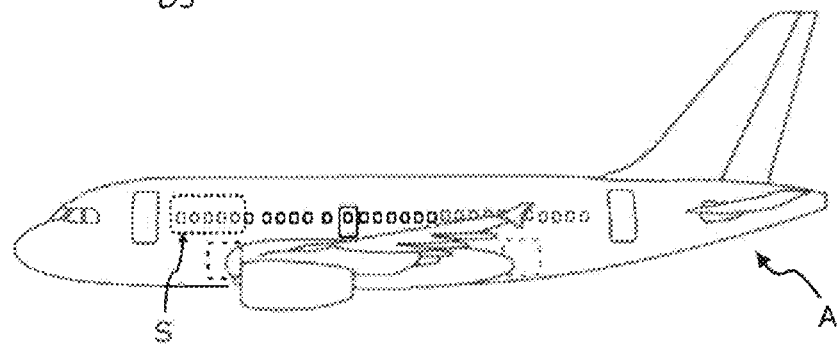
FIG. 3 is a schematic side view showing a passenger seat arrangement according to FIG. 1 and/or FIG. 2 according to a further embodiment of the invention.
Figure 4:
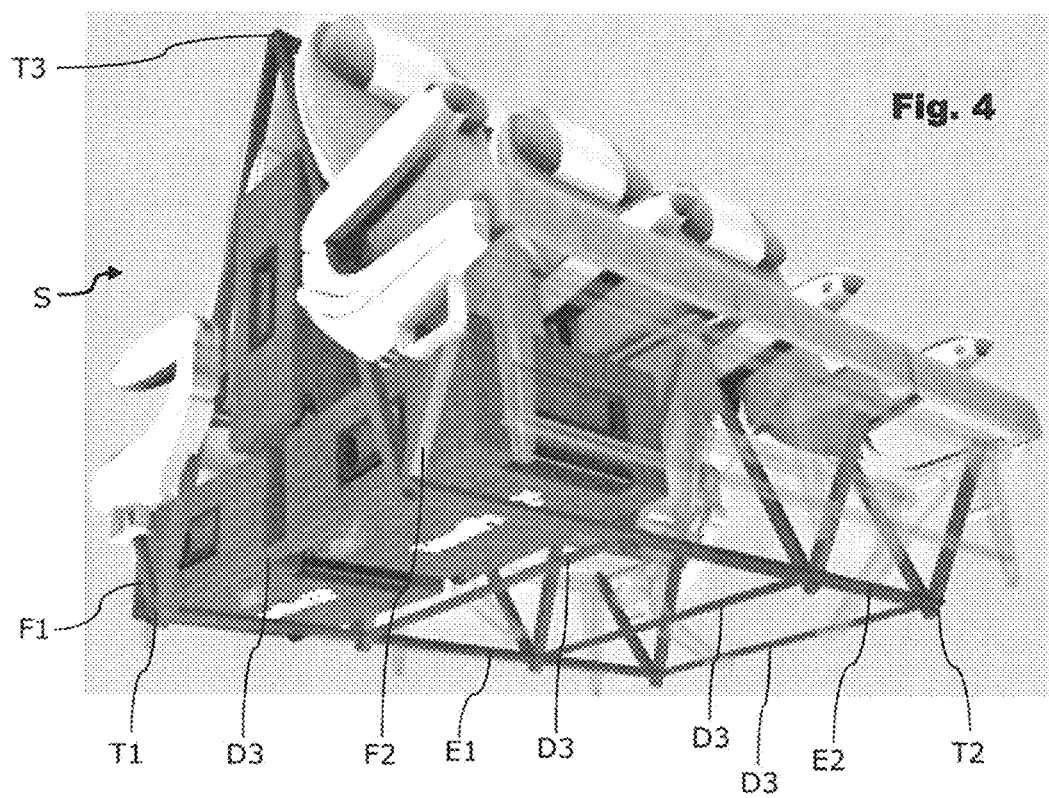
FIG. 4 is a perspective inclined view of the underside of a passenger seat arrangement according to a further embodiment of the invention.
Figure 5:
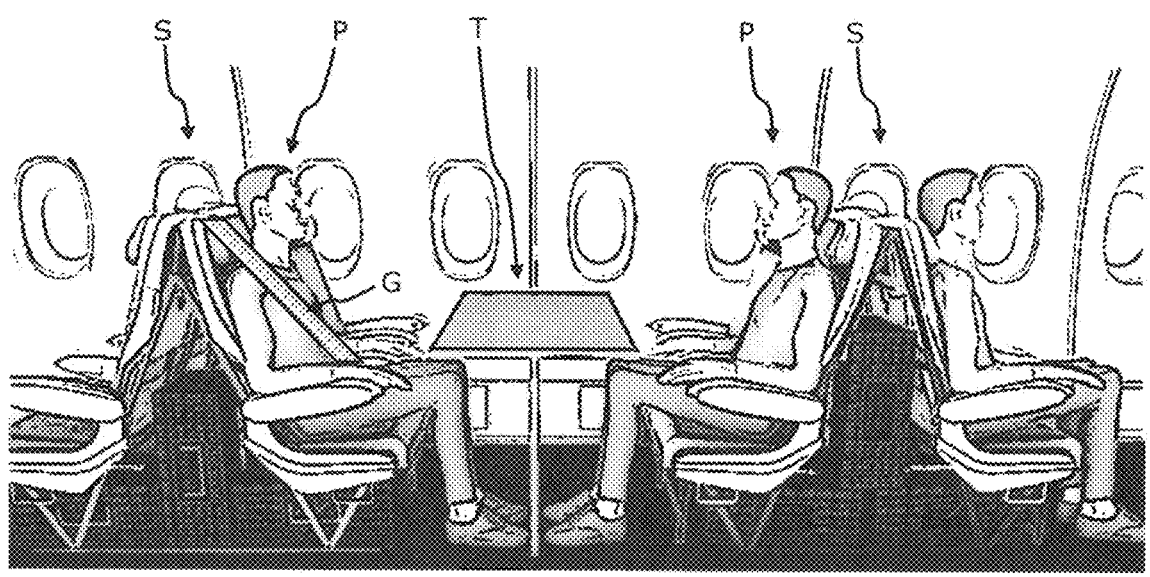
FIG. 5 is a schematic detail of a passenger cabin of an aircraft, in which a plurality of passenger seat arrangements according to FIGS. 1, 2 and/or 4 are installed.

The passenger seat arrangements S, shown in FIGS. 1, 2 and 4, can be used, for example, in a passenger aircraft A, as shown by way of example in FIG. 3. In this case, a plurality of passenger seat arrangements S each having at least one left-hand side passenger seat S1 and one right-hand side passenger seat S2 can be installed in a suitable layout in a passenger cabin of the passenger aircraft A. By way of example, FIG. 5 shows a detail of a passenger cabin of this type of the passenger aircraft A, in which, as an example, two passenger seat arrangements S are mounted, as described in connection with FIGS. 1, 2 and/or 4.

In this case, the two passenger seat arrangements S can each have, for example, two left-hand side and two right-hand side passenger seats S1 and S2 next to one another, thereby creating rows of seats each having two seats. In this case, the two passenger seat arrangements S can be arranged in tandem in the direction of flight of the passenger aircraft A, so that a free space is created between the passenger seat arrangements S, in which for example a table T can be installed. The table T can be, for example, a folding table which is connected to the outer wall of the passenger cabin by a folding hinge. The length of the table T can correspond to the width of the rows of seats, so that passengers P occupying the passenger seats S1 and S2 of the passenger seat arrangements S can use the table T to set down items such as laptops, meal trays or books.

Again mainly with reference to FIGS. 1, 2 and 4, the passenger seat arrangements S are designed such that the rear side of the second backrest(s) B2 faces the rear side of the first backrest(s) B1. Consequently, passengers P on the passenger seats S1 and S2 are sitting back-to-back in each case. For a cabin layout of FIG. 5, this means that passengers P on tandem-arranged passenger seat arrangements S sit opposite one another, facing one another, i.e., a passenger on a passenger seat S2 of a first passenger seat arrangement sits opposite and facing a passenger on a passenger seat S1 of a second passenger seat arrangement arranged in front of the first passenger seat arrangement.

Such "face-to-face" arrangements of passenger seats allow a flexible seating of passengers and are particularly suitable for families, business partners, friends or the like who are travelling together. Such people can communicate with one another substantially more easily in passenger seat arrangements of this type. On the other hand, to a certain extent, "face-to-face" arrangements automatically form "compartments" which are delimited by design by adjacent compartments which are in front and behind; for a further, particularly acoustic delimitation of adjacent compartments, it is possible to fit partitions, such as curtains that can be drawn back or transparent wall elements, between the backrests B1 and B2 of the passenger seat arrangements S.

The passenger seat arrangements S of FIGS. 1 and 2 have a seat supporting frame, for example consisting of metal struts or carbon fiber-reinforced plastics material. In a side view, the seat supporting frame substantially forms an isosceles triangle, consisting of a first backrest reinforcing strut D1 which is arranged along the first backrest B1 at a first inclination angle θ1 with respect to the horizontal, and of a second backrest reinforcing strut D2 which is arranged along the second backrest B1 at a second inclination angle θ2 with respect to the horizontal. A floor supporting strut D3 can also be provided which is arranged between the floor-side ends T1, T2 of the first and second backrest reinforcing struts D1, D2. The constructive configuration of the floor supporting strut D3 required to receive the load of the aircraft seat can take into consideration the fact that the first and second backrest reinforcing struts D1, D2 are fastened to the seat rail on the cabin floor of a passenger aircraft A. The floor supporting strut D3 can possibly be dispensed with if the configuration calculations show that for the crash behavior of the passenger seat arrangement, the seat rail on the cabin floor takes over the function of the floor supporting strut D3. The floor-side ends T1 and T2 form the load take-up points for the fastening of the passenger seat arrangements S to the floor of a transport vehicle, for example to seat rails of a passenger aircraft A.

The isosceles form of the triangular shape of the seat supporting frame, i.e., the fact that the first and the second inclination angle θ1 and θ2 are complementary or supplementary angles, provides a load-optimized supporting structure for the passenger seat arrangement S, which approximately halves the loads to be received in each case at the load take-up points T1 and T2 compared to conventional seat fastening means. For example, the regulations set out by the FAA require all aircraft seats to be so-called "16 g" seats. This means that the seats must withstand loads of up to 16 g under predefined test conditions. Due to the load-optimized structure of the backrest reinforcing struts D1, D2, it is much easier to observe the 16 g requirement set out by the FAA. Consequently, the passenger seat arrangements S can be produced while advantageously reducing the system weight.

Furthermore, the apex T3 of the triangular seat structure, i.e., the connection of the two ends of the second backrest reinforcing struts D1, D2 is a fixed anchor point, for example for the installation of a three-point belt. A three-point belt of this type can have a belt webbing (as shown by way of example in FIG. 5 by reference sign G) which restrains passengers who are sitting in forward-facing seats during an abrupt braking maneuver. A three-point belt G of this type can be anchored in a mechanically stable manner to the seat supporting frame at the anchor point T3.

The free space between the first and second backrest reinforcing struts D1 and D2 and under the seat surfaces of the first and second passenger seats S1 and S2 can advantageously be used as luggage storage space for passengers' hand luggage. Space can be created for various standard sizes of pieces of luggage, subject to the length of the backrest reinforcing struts D1 and D2 and to the choice of the inclination angles θ1 and θ2. FIGS. 1 and 2 show two exemplary implementation variants which each create space for two pieces of luggage L1 and L2 on the floor under the seat surfaces C1 and C2 of the passenger seats S1 and S2. A third piece of luggage L3 can either be stacked between the backrests B1 and B2 on the two pieces of luggage L1 and L2 (see FIG. 1) or can be placed between the backrests on the floor in the middle between the two pieces of luggage L1 and L2 (see FIG. 2). In some circumstances, a luggage storage space of this type can make it possible to dispense with storage space above the seats, such as an overhead locker or dedicated luggage compartments under the cabin ceiling in passenger aircraft.

Seat surface reinforcing struts F1 and F2 can be provided to reinforce the mechanical stability of the passenger seat arrangements S. These reinforcing struts can extend between the floor supporting strut D3 and the underside of the seat surface C1 and C2 of the first or second passenger seat S1 and S2, respectively. The seat surface reinforcing struts F1 and F2 can be arranged at a suitable inclination angle with respect to the horizontal and can introduce their load into the floor at the floor-side load take-up points T1 and T2.

Furthermore, first and second assembly crossbeams E1 and E2 can be provided which facilitate the connection of the passenger seat arrangements S on the floor of the transport vehicle (see FIG. 4). The use of assembly crossbeams can mean that seat fastening rails which are attached in the floor can be omitted. The assembly crossbeams E1 and E2 extend vertically to the floor supporting strut D3 and are connected to the floor-side load take-up points T1 and T2 of the first and second backrest reinforcing struts D1 and D2.

The seat arrangements which have been described can be used in all branches of the transport industry, for example for road vehicles, for rail vehicles or for watercraft.

In the preceding detailed description, various features have been combined in one or more examples to improve the cogency of the description. However, in this respect, it should be clear that the above description is merely of an illustrative nature, and is in no way restrictive. It serves to cover all alternatives, modifications and equivalents of the various features and embodiments. Many other examples will be immediately and directly clear to a person skilled in the art when reading the above description, on account of his knowledge in the art.

The embodiments have been selected and described in order to be able to present, in the best possible way, the fundamental principles of the invention and the possible applications thereof in practice. As a result, persons skilled in the art can optimally modify and use the invention and the various embodiments thereof with regard to the intended purpose of use. In the claims and description, the terms "containing" and "having" are used as linguistically neutral concepts for the corresponding term "comprising." Furthermore, the use of the terms "a", "an" and "one" should not in principle exclude a plurality of features and components described in this manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat arrangement for a transport vehicle comprising:
   at least one first passenger seat having a first backrest;
   at least one second passenger seat having a second backrest which has a rear side which faces a rear side of the first backrest; and
   a seat supporting frame which has:
      a first backrest reinforcing strut having a floor side end extending from a floor along the first backrest at a first inclination angle with respect to the horizontal;
      a second backrest reinforcing strut having a floor side end extending from the floor along the second backrest at a second inclination angle, the second inclination angle comprising a supplementary angle to the first inclination angle, with respect to the horizontal,
   wherein the first backrest reinforcing strut and the second backrest reinforcing strut form equal sides of an isosceles triangle, and,
   wherein both the first backrest reinforcing strut and the second backrest reinforcing strut extend along their respective sides of the isosceles triangle from an apex of the triangle to the floor;
      a floor supporting strut arranged between the floor-side ends of the first and second backrest reinforcing struts;
      a first seat surface reinforcing strut which is arranged between the floor supporting strut and an underside of a seat surface of the first passenger seat; and
      a second seat surface reinforcing strut which is arranged between the floor supporting strut and an underside of a seat surface of the second passenger seat.

2. The passenger seat arrangement of claim 1, wherein the passenger seat arrangement has at least two first adjacently arranged passenger seats and at least two second adjacently arranged passenger seats, the backrests of which are all arranged in a coplanar manner.

3. The passenger seat arrangement of claim 2, further comprising a first assembly crossbeam which is connected to the floor-side end of the first backrest reinforcing strut vertically to the floor supporting strut.

4. The passenger seat arrangement of claim 3, further comprising a second assembly crossbeam which is connected to the floor-side end of the second backrest reinforcing strut in parallel with the first assembly crossbeam.

5. The passenger seat arrangement of claim 1, wherein ends, opposite the floor-side ends, of the first and second backrest reinforcing struts are connected at an anchor point.

6. The passenger seat arrangement of claim 5, further comprising at least one three-point belt for one of the passenger seats which is anchored to the seat supporting frame at the anchor point.

7. The passenger seat arrangement of claim 1, wherein a free space between the first and second backrest reinforcing struts and under seat surfaces of the first and second passenger seats is designed as a luggage storage space.

8. A passenger aircraft, having at least one passenger seat arrangement comprising:
   at least one first passenger seat having a first backrest;
   at least one second passenger seat having a second backrest which has a rear side which faces a rear side of the first backrest; and
   a seat supporting frame which has:
      a first backrest reinforcing strut having a floor side end extending from a floor along the first backrest at a first inclination angle with respect to the horizontal;
      a second backrest reinforcing strut having a floor side end extending from the floor along the second backrest at a second inclination angle, the second inclination angle comprising a supplementary angle to the first inclination angle, with respect to the horizontal,
   wherein the first backrest reinforcing strut and the second backrest reinforcing strut form equal sides of an isosceles triangle, and,
   wherein both the first backrest reinforcing strut and the second backrest reinforcing strut extend along their respective sides of the isosceles triangle from an apex of the triangle to the floor;
      a floor supporting strut arranged between the floor-side ends of the first and second backrest reinforcing struts
      a first seat surface reinforcing strut which is arranged between the floor supporting strut and an underside of a seat surface of the first passenger seat; and
      a second seat surface reinforcing strut which is arranged between the floor supporting strut and an underside of a seat surface of the second passenger seat.

9. The passenger aircraft of claim 8, having at least two passenger seat arrangements, wherein the two passenger seat arrangements are arranged in tandem in the direction of flight of the passenger aircraft.

10. The passenger aircraft of claim 9, further comprising a table which is installed in the free space between the two passenger seat arrangements.

11. The passenger aircraft of claim 8, wherein at least one of the floor supporting strut or the floor-side ends of the first and second backrest reinforcing struts of the at least one passenger seat arrangement is rigidly connected to a seat rail which is arranged on the floor of a passenger cabin of the passenger aircraft.

* * * * *